United States Patent [19]

Kleisle

[11] Patent Number: 5,228,478

[45] Date of Patent: Jul. 20, 1993

[54] WEAR INDICATOR FOR MATERIAL TRANSFER SYSTEMS

[76] Inventor: James R. Kleisle, 7500 Raleigh Dr., St. Louis, Mo. 63123

[21] Appl. No.: 783,393

[22] Filed: Oct. 28, 1991

Related U.S. Application Data

[63] Continuation of Ser. No. 708,796, May 30, 1991, abandoned, which is a continuation of Ser. No. 305,390, Feb. 1, 1989, abandoned.

[51] Int. Cl.$^5$ .......................................... F16L 55/00
[52] U.S. Cl. ................................... 138/104; 138/36; 174/47; 116/208
[58] Field of Search ................ 138/36, 103, 104, 177, 138/178; 340/605; 116/208; 137/312; 406/34, 191, 193; 174/47

[56] References Cited

U.S. PATENT DOCUMENTS

| | | | |
|---|---|---|---|
| 1,894,295 | 1/1933 | Scandore | 138/104 |
| 2,099,126 | 11/1937 | Lapsen | 138/104 |
| 2,110,079 | 3/1938 | Butler | 138/36 |
| 2,141,776 | 12/1938 | Vautier et al. | 138/177 |
| 2,181,035 | 11/1939 | White | 138/104 X |
| 2,220,895 | 11/1940 | Epstein | 138/104 X |
| 2,624,308 | 1/1953 | Wittlin | 138/36 |
| 3,343,568 | 9/1967 | Branscum et al. | 138/178 |
| 3,721,898 | 3/1973 | Dragomis et al. | 138/104 |
| 3,911,959 | 10/1975 | Frank | 138/36 |
| 3,922,999 | 12/1975 | Meginnis | 138/36 |
| 4,029,889 | 6/1977 | Mizuochi | 138/104 |
| 4,258,515 | 3/1981 | Owen | 138/104 X |
| 4,258,755 | 3/1981 | Higbee | 138/104 |
| 4,338,097 | 7/1982 | Turner et al. | 116/208 |
| 4,344,320 | 8/1982 | Haupt et al. | 138/104 |
| 4,446,892 | 5/1984 | Maxwell | 138/104 |
| 4,474,217 | 10/1984 | DeMopse et al. | 138/137 |
| 4,523,141 | 6/1985 | Thomas et al. | 138/104 |
| 4,735,083 | 4/1988 | Teneboum | 138/36 |

FOREIGN PATENT DOCUMENTS

| | | | |
|---|---|---|---|
| 0058653 | 8/1982 | European Pat. Off. | 138/104 |
| 2552508 | 5/1977 | Fed. Rep. of Germany | 138/104 |
| 2854016 | 7/1980 | Fed. Rep. of Germany | 138/104 |
| 0156216 | 10/1979 | Japan | 138/104 |
| 810999 | 3/1959 | United Kingdom | 138/36 |
| 2023296 | 12/1979 | United Kingdom | 138/104 |
| 1578316 | 11/1980 | United Kingdom | 138/104 |

*Primary Examiner*—James E. Bryant, III
*Attorney, Agent, or Firm*—Richard G. Heywood

[57] ABSTRACT

An early warning system for a material transfer system having an elongated area to be monitored for internal wear caused by erosive flow action of a transfer material. A material transfer conduit has an inner surface forming a flow passageway for the transfer material and an outer wall surface with a wear detection indicator normally visible in situ at an elongate section of the outer wall and being subject to obliteration upon wear-through of an underlying portion. A translucent or transparent outer containment layer surrounds the outer wall surface of the transfer conduit The wear indicator is colored to contrast with the transfer material and indicates wear by an eroded area which can be visually observed through the outer translucent layer.

19 Claims, 4 Drawing Sheets

WEAR INDICATOR FOR MATERIAL TRANSFER SYSTEMS

This application is a continuation of application Ser. No. 708,796 filed May 30, 1991, now abandoned, which was a continuation of parent application Ser. No. 305,390 filed Feb. 1, 1989, now abandoned.

BACKGROUND OF THE INVENTION

Technical Field

The invention relates generally to particulate and fluid material transfer systems, and more particularly to an early warning system for visually and/or electronically detecting internal wear in material transfer conduits.

Background Prior Art

Internal wear in material transfer systems caused by abrasion or erosion during the flow of particulate or fluid materials therethrough ultimately results in conduit wear-through and failure and, therefore, constitutes a continuing problem in manufacturing facilities. In the molding process for fabricating various plastic items, for instance, the particulate material constitutes plastic "pellets" which are transferred from remote storage silos to the molding machines through material transfer conduits typically formed of aluminum or stainless steel pipes or glass or ceramic lined steel conduits. The degree of erosion and internal conduit wear depends upon several factors, such as type and thickness of the conduit material, the abrasive nature or degree of the material being transferred, the flow rate, etc. Conduit failure is accelerated in transfer systems for plastic pellets containing fiberglass as a constituent thereof. Thus, a typical aluminum piped system for fiberglass reinforced pellets may last only about three months, whereas a stainless steel system may last for about three years depending upon the wall gauge of the transfer conduit and configuration of the system. Glass tubing is as durable as stainless steel and available with thicker walls so that it may have a life span in excess of ten years. In any case, there is no present way of predetermining with accuracy when or just where wear-through and conduit failure will occur, and such occurrence obviously creates clean-up problems from massive dumping and potentially extensive down-time for repair or replacement of the worn-out conduits. In cases involving the transfer of certain chemicals and hazardous materials, health and safety problems are likely to result from failure of such material transfer systems.

Warning systems for detecting fluid leaks are known in the prior art. For example, Frank U.S. Pat. 3,911,959 describes an early warning hose comprising a water-absorbent layer sandwiched between an inner hose and a translucent outer hose so that any liquid leaking from the inner hose permeates the absorbing layer and may be observed because of the translucency of the outer hose.

Sibthorpe U.S. Pat. No. 3,299,417 suggested a flexible pressure tube and conduit having two walls separated by a narrow gap. The inner wall serves to normally confine the pressure medium inside the tube and the outer wall forms a closed chamber or jacket with the inner tube. The gap communicates with a pressure-responsive signal device to produce a signal when the pressure in the jacket rises due to leakage from the interior tube through the inner wall.

Meginnis U.S. Pat. No. 3,922,999 describes a sight glass used in fluid systems of a corrosive nature, the sight glass having an insert of a nontransparent color, and preferably opaque, that is secured in a recess in the exposed surface of the glass. When the insert is no longer visible, this indicates that the exposed surface has been worn to an unsafe condition and the sight glass requires replacement.

It is also known that double-containment systems using dual concentric pipes have been employed in material transfer systems, but without visual detection apparatus. Also, electronic leak detection has been offered for use at selected strategic points in toxic chemical and like fluid conveying systems, typically at connection joints between pipes or with tanks, pumps or the like.

These prior art systems are generally ineffective in identifying wear in material transfer conduits conveying viscous abrasive fluids or particulate materials such as carbon particles or plastic pellets. Furthermore, these systems are ineffective in specifically indicating the location of the wear throughout the transfer system.

DISCLOSURE OF THE INVENTION

It is an object of this invention to provide a wear indicator which detects and visually indicates the location of wear-through in any portion of a material transfer conduit.

It is another object of this invention to provide a wear indicator or early warning system which visually and/or electronically detects and indicates the existence and location of a worn area in a transfer conduit.

Another object of this invention to provide a wear indicator for indicating wear in a material transfer conduit which is relatively inexpensive and applicable to existing transfer systems.

It is yet another object of the present invention to provide an early warning system for a conduit conveying plastic pellets, and which detects and indicates conduit wear-through before leakage or dumping of the pellets occurs.

Another object of the invention is to provide wear indicator improvements in particulate conveying systems for visually detecting an area of conduit wear-through at an early stage and permit corrective maintenance to obviate catastrophic failure of the system.

These and other objects and features will become more apparent hereinafter.

The invention is embodied in a wear indicator forming an early warning system for a material transfer conduit subjected to internal wear and caused by abrasive contact between the internal surface area of the transfer conduit and the material being transferred. The wear indicator comprises visually distinguishable detection means applied in intimate contact to an external surface area of the transfer conduit and being worn away by the transfer material upon wear-through of the underlying conduit wall. The invention further comprises translucent external coating means encasing the transfer conduit area and detection means, and the early warning system may also be embodied in an electronic signalling circuit subjected to abrasive wear and giving an audible and/or visual warning upon its destruction at any point.

BRIEF DESCRIPTION OF THE DRAWINGS

In the drawings which illustrate embodiments of the invention.

PREFERRED EMBODIMENT OF THE INVENTION

The present wear indicator invention is applicable to a wide range of material conveying or transfer systems for transfer materials such as particulate materials and viscous fluids containing abrasive substances, e.g. fused alumina, granular or powdered phosphates, silicates and calcines, grain, slurries containing graphite (carbon) and the like. These material transfer systems operate with pneumatic or vacuum material flow movers of 30 psi or above in a high pressure dense phase conveying producing particulate flow velocities in the magnitude of 5000 ft./min., and in the range of 10–15 psi in a dilute phase which produces particulate velocities in the magnitude of about 3500 ft./min. All particulate materials, abrasive slurries and the like have an eroding effect on the inner wall surface of transfer conduits that ultimately will cause wear-through and failure, but the life span and location of failure in the transfer system is unpredictable due to "duning" of material creating turbulance and eddy effects, especially in the dense phase.

Figure 1:
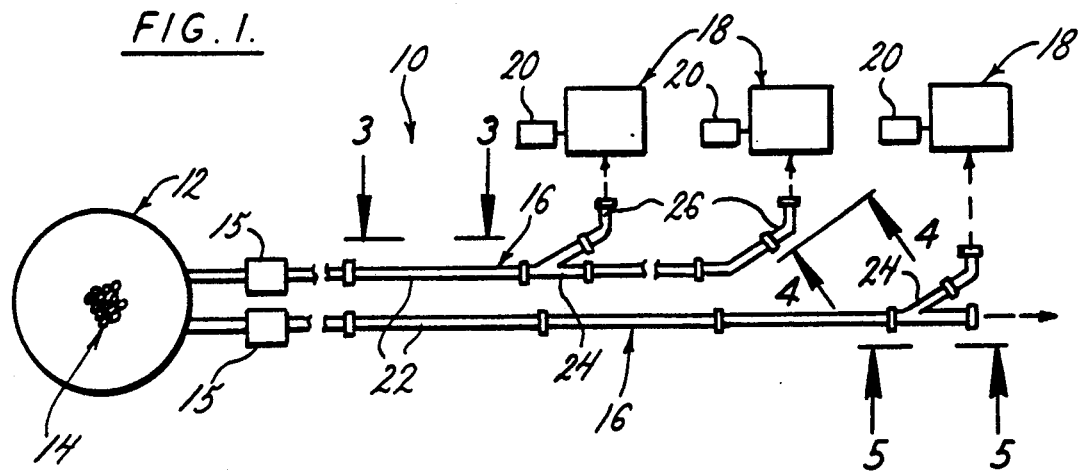
FIG. 1 is a diagrammatic view of a material transfer system in which the invention may be embodied.

The manufacture of molded plastic items typifies particulate material flow problems and conduit failure in material transfer systems. The manufacture of molded plastic parts, either by compression or injection, utilizes small, discrete plastic cylinders or the like, that may be any color and are referred to in the trade as "pellets". Such pellets are especially abrasive and wear-inducing when the plastic material contains fiberglass as a constituent. Thus, for purposes of disclosing the preferred embodiments of the invention, a typical material conveying or transfer system 10 for the molding of plastic parts is shown in FIG. 1.

The material transfer system 10 comprises a remote storage silo 12 containing a bulk supply of plastic pellets 14, driers 15, one or more delivery lines or piping systems 16, and one or more molding machines 18 to which the pellets 14 are conveyed by vacuum means 20 or the like for manufacturing purposes. The piping system 16 is made up of a series of straight conduits 22, branch "Y" connectors 24 and mitered or sweep elbows 26. It will be understood that a similar material transfer system (not shown) may be employed to charge the bulk storage silo 12 from one or more pellet making machines, and that either pneumatic (positive air pressure) or vacuum may be used to provide pellet flow through the piping systems 16. It will also be understood that the piping system 16 of a typical material conveying system 10 may be made of aluminum, stainless steel, ceramic lined steel, PVC, boro-silicate glass or from a variety of metal alloys. However, a glass piping system is presently preferred for application of the wear indicator invention.

For many years, boro-silicate glass piping systems have been used by various industries because such glass piping systems last a great deal longer than conventional metal piping systems because it has a thicker conduit wall, and it is harder and causes less friction to particulate flow. Glass piping systems may be unarmored, or armored with an exterior fiberglass reinforced material that is applied by encasing the boro-silicate piping with a fiberglass cloth saturated with a polyester resin cured by heat and pressure according to known technology. Thus, the armored pipe system consists of an inner glass conduit or liner encased within a translucent fiberglass reinforced coating or casing. The purpose of the fiberglass armoring is to contain the pellets and prevent massive dumping of the pellets when erosion causes the glass to fail. However, in the past it has been difficult to visually detect this erosion because the flowing colored pellets tend to obscure the erosion. Generally, the highest incidents of failure occur at a change of direction of the glass piping system, such as at the bends of mitered elbows 26, or at the connection joints between conduit sections and the like. In addition, eddy effects are generated by particulate "duning" due to irregularities on the internal transfer surface such as the lack of uniform concentricity of the piping and the variance in the inside diameters of the system at lap joints or due to gaskets between adjoining conduit sections. As a result, these eddy effects may cause significant wear in the areas of such piping irregularities.

The invention relates to a system for indicating by visual means, electronic means or both, that the inner boro-silicate glass piping has been eroded and that the pellets are now in contact with and beginning abrasive wear of the outer fiberglass armoring.

Figure 2:
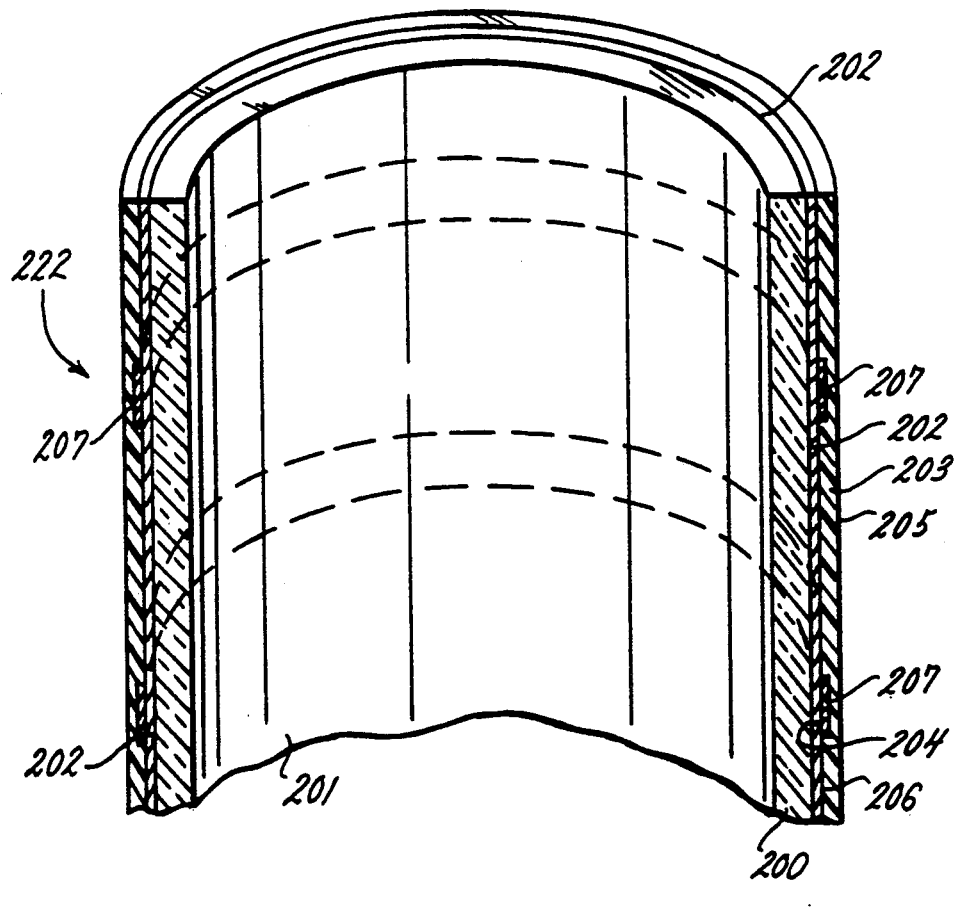
FIG. 2 is a longitudinal, cross-sectional view of a length of transfer conduit embodying one form of the invention.

FIG. 2 illustrates a representative cross-section of one embodiment of the invention employing a visual indicator. The boro-silicate glass conduit 222 has a cylindrical wall 200 with an interior surface 201 which forms an inner passageway or flow path through which the pellets 14 are transferred. Obviously, it is the interior surface area which is subjected to abrasive action resulting in wear-through of the conduit wall 200. The conduit wall 200 has an outer surface 202 opposing the inner surface 201 and which forms the outer circumferential area of conduit 222. An outer conduit casing 203 is formed by the armored fiberglass layer mentioned above for containing the pellet material, and it completely surrounds the wall 200. The outer casing 203 has an inner surface 204 facing outer surface 202 and an outer surface 205. A wear indicator embodying the invention is positioned between the inner surface 204 of outer conduit 203 and the outer surface 202 of conduit wall 200 and is in intimate surface contact with both. In its simplest form, the wear indicator is formed by applying a layer, coating or stripe of predetermined color to the outer surface 202 of the wall 200. A colored indicating layer 206 may be a layer of paint applied to the outer surface 202 before the armored layer or casing 203 is applied over the conduit 222 or other component (24, 26) of the piping system 16. Generally, paint does not adhere well to glass or other nonporous surfaces. However, this does not present a problem because the color indicating layer 20, whether it is paint or some other material, is held in place by outer casing 203. Alternatively, the color indicating layer 206 may be comprised of several contrasting colors painted on outer surface 202 of the wall 200. Also, layer 206 may be a first colored coating or substrate such as a white paint or other light colored coating, applied or painted to the outer surface 202 and then covered, at least in part, by a second layer 207 of contrasting color, such as a black or other dark colored coating, located between the first layer 206 and the outer conduit 203. It has been discovered that a white substrate enhances the color intensity of most wear indicator materials. In one embodiment of the invention, the contrasting layer 207 may be a band or strip of tape applied to a painted coating 206 as illustrated in FIG. 2. The tape preferably is spirally wound about the coating 206 before being covered by the outer conduit 203. In general, the invention contemplates that any colored substance or layer for usually indicating wear by abrasion may be located between the inner glass liner 200 and the outer fiberglass protective casing 203. The outer fiberglass casing 203 is cured by heat and pressure. In particular, casing 203 is pressure treated, such as by wrapping it with a shrink wrap (e.g., mylar cellophane tape) and heating the shrink wrap at a predetermined temperature to circumferentially pressurize the casing 203. This applied pressure clarifies the setting resin of the fiberglass casing and makes it more transparent so that the colored indicating layer 206 is more visually apparent through the casing 203. Without pressure treatment, the fiberglass casing 203 may tend to be cloudy and almost opaque. The pressure treatment also maintains the colored indicating layer 206 in place between the inner surface 204 and outer surface 202 and maintains layer 203 in intimate contact with wall 200.

Figure 3:
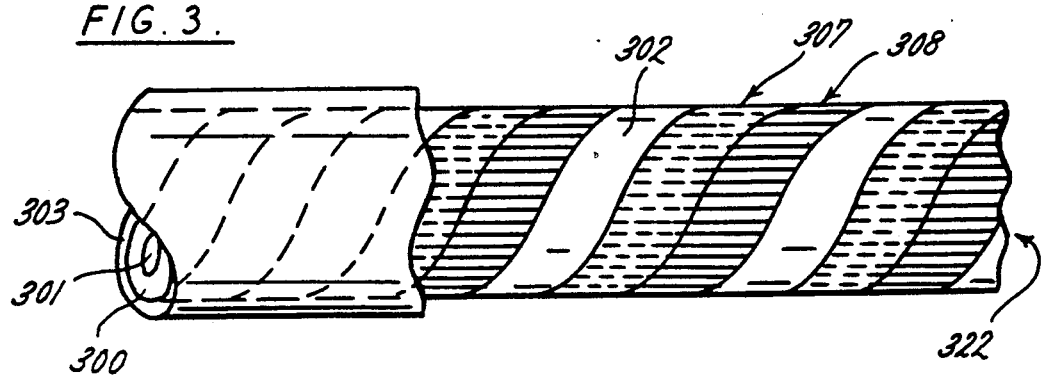
FIG. 3 is a greatly enlarged elevational view, partly broken away, of a straight section of transfer conduit taken substantially at line 3—3 of FIG. 1, and showing another form of the invention.

FIG. 3 illustrates a preferred embodiment in which two widths or bands of contrasting colored tapes 307 and 308 are spirally wound around the outer surface 302 of the glass conduit 322 before an armored casing 303 is applied. In this embodiment the bands 307 and 308 form abutting or contiguous helices and are spaced apart by a similar uncoated band of bare glass conduit wall surface 302 through which the pellets 14 are visible. Inasmuch as different colors of pellets 14 may be stored and delivered through the driers and transfer system piping 16 to the molding machines 18 for making different plastic parts at different times, the contrasting dual tapes 307 and 308 assure that there will always be at least one wear indicator of contrasting color to the pellet color. Consider the case in which yellow pellets are transferred and the pipe is wound with a blue tape 308 adjacent to a yellow tape 307 and the tapes are separated by an untaped band or gap on the conduit outer surface (302). In normal operation, the operator would see the blue tape 308 even though no color distinction can be made between the yellow tape 307 and the yellow pellets. When a portion of the wall 300 of the glass conduit 307 becomes eroded at a wear-through point, the red tape 308 (and yellow tape) will be worn off so that only the yellow pellets will show through at the abraded area where there is no tape. The operator will see only yellow where the red tape had been, and will be visually alerted that the inner wall 300 has been eroded or worn away at that point. This visual warning indicates to the operator that the pellets are now in contact with the outer fiberglass armoring of outer conduit 303. Obviously, in the case of a material delivery or transfer system in which the pellet color is different from both colored bands (i.e., red pellets 14 with yellow and blue color bands 307 and 308), the red pellets will be visible through the untaped band (302 of FIG. 3) of the glass conduit 322 so all three colors will normally be seen until wear-through of the conduit wall 300 results in abrasion of both colored tapes 307 and 308 and then only the color red will be visible at the wear-through area.

Figure 4:
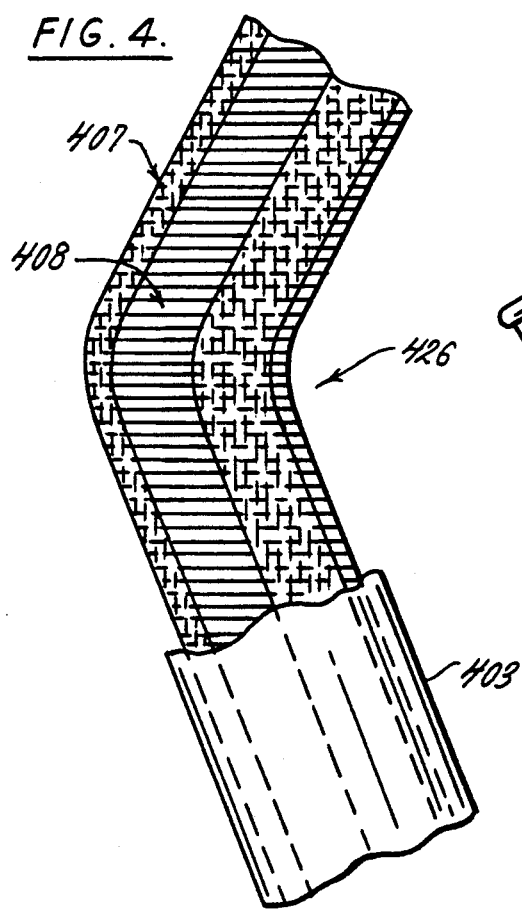
FIG. 4 is a view similar to FIG. 3 of a conduit elbow of the transfer system taken substantially at line 4—4 of FIG. 1, and showing a modification of the invention form shown in FIG. 3.

FIG. 4 is similar to FIG. 3 in illustrating that dual colored bands 407 and 408 may be applied to an elbow fitting 426 or the like. It is contemplated that different components of the piping system 16 may receive different forms of the wear indicator invention. For instance, the straight length conduit sections 22, 222, 322 may be spirally wound with one or more colored bands (307, 308), and the fittings (24, 26, 426) may be painted and/or tape banded. Obviously, if the material transfer system 10 is designed for a specific particulate or abrasive fluid material of only one predetermined color, then the wear indicator can be designed with a single contrasting color.

It is also contemplated that fluorescent tape or paint may be used as one or both of the colored layers to provide a more vivid visual color recognition. However, for those installations in which the conduit system may be located outdoors or otherwise subjected to ultraviolet radiation, a protective ultraviolet screen or filter must be placed over the fluorescent paint before the armoring is applied in order to prevent fading. Another alternative may be the use of regular masking tape which has been dyed as the contrasting layer 207. Masking tape may be preferable in certain installations which withstand high temperatures. Also, masking tape can withstand the temperatures which are necessary to cure the armored layer outer conduit 203. In contrast, vinyl tape may be used but it tends to shrink slightly at the curing temperature. As indicated, vinyl tapes, such as vinyl fluorescent pressure sensitive tapes, provide much more vivid colors and are easier to inspect and see through the translucent outer conduit 203.

Figure 5:
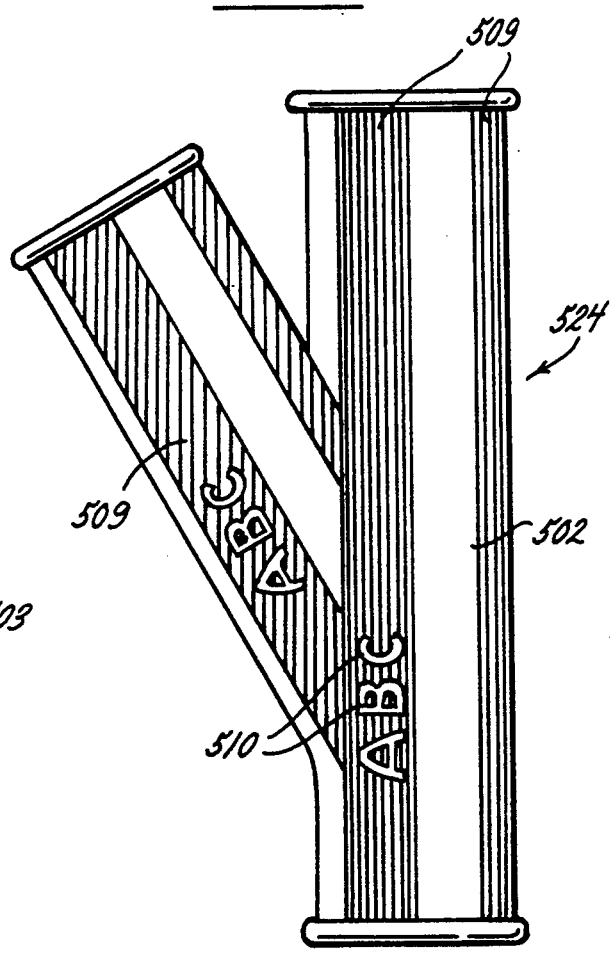
FIG. 5 is another view similar to FIG. 3 of a conduit "Y" connection taken at line 5—5 of FIG. 1.

In another preferred embodiment shown in FIG. 5, pressure sensitive paper tape 509 of a predetermined color (i.e., blue) may be used either as a single color banding or in a dual banded wear indicator system as discussed above. Paper tape can be economically produced in any single color or with multiple bands from a bi-color stripe to a rainbow pattern, and also permits printing with operating or safety instructions or other indicia 510. Thus, a piping "Y" fitting 524 or other conduit or fitting may be axially (or spirally) striped with a color band 509 to leave an untaped area (502) of the fitting or conduit, or the outer surface 502 may have a layer of paint of one color over which a band or tape of contrasting color may be applied, as indicated in FIG. 2. An object of the invention is for the wear indicator to be abraded off at the wear-through area as quickly as possible, and both paint and paper tape best meet this objective.

Figure 6:
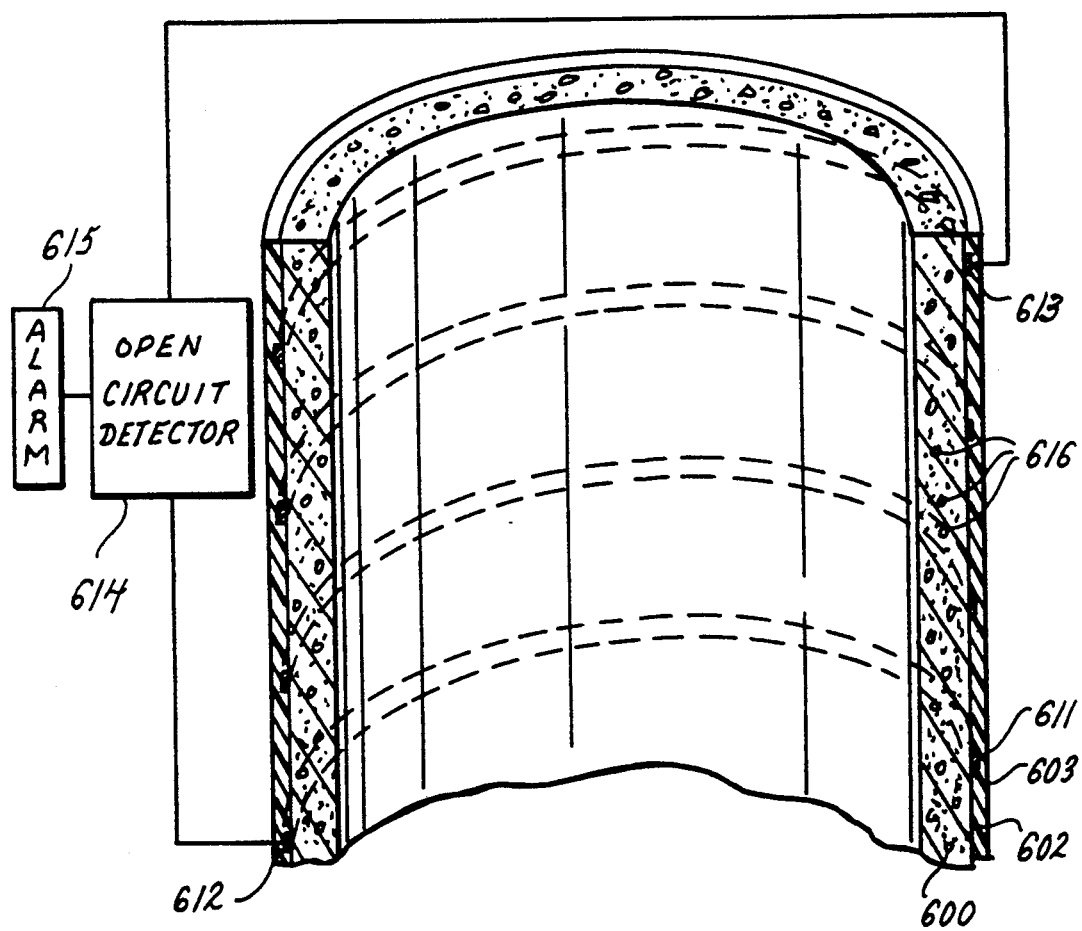
FIG. 6 is a longitudinal, cross-sectional view of a length of colored transfer conduit having a spirally wound electronic detection conductor.

FIG. 6 illustrates an electronic wear indicating embodiment of the invention. Electrical conductor 611 is spirally wrapped in a continuous helix around the outer surface 602 of conduit wall 600 and is located between wall 600 and outer armored casing 603. Preferably, conductor 611 is relatively narrow in width and relatively shallow in depth, such as a ribbon conductor, so that the conductor is quickly abraded at the wear-through area. The ends 612 and 613 of the conductor 611 are connected to an open circuit detector 614 connected to an audible or visual alarm 615. FIG. 6 also illustrates another alternative feature of the invention wherein the glass conduit 600 is impregnated or colored with a substance 616, indicated by dots. Preferably, the color of the substance 616 is selected to always be in contrast with the color of the pellets 14 or other material to be transferred. In operation, when the wall 600 is worn away through its outer surface 602 and a portion of conductor 611 is similarly worn through by the pellets being transferred, a discontinuity in the conductor 611 exists that is detected by the open circuit detector 614 and the alarm system 615 is energized to alert the operator that a portion of wall 600 has been worn away and the pellets are in contact and being held in place only by outer armored casing 603. The operator can then locate the precise wear point by visual inspection. This is determined by looking through the transparent outer casing 603 for the point or points where the pellet color can be seen. This wear-through area is visually obvious because a portion of colored wall 600 and a portion of conductor 611 creates a void and the colored pellets 14 are now in direct contact with the outer layer casing 603 and visible at this point.

Figure 7:
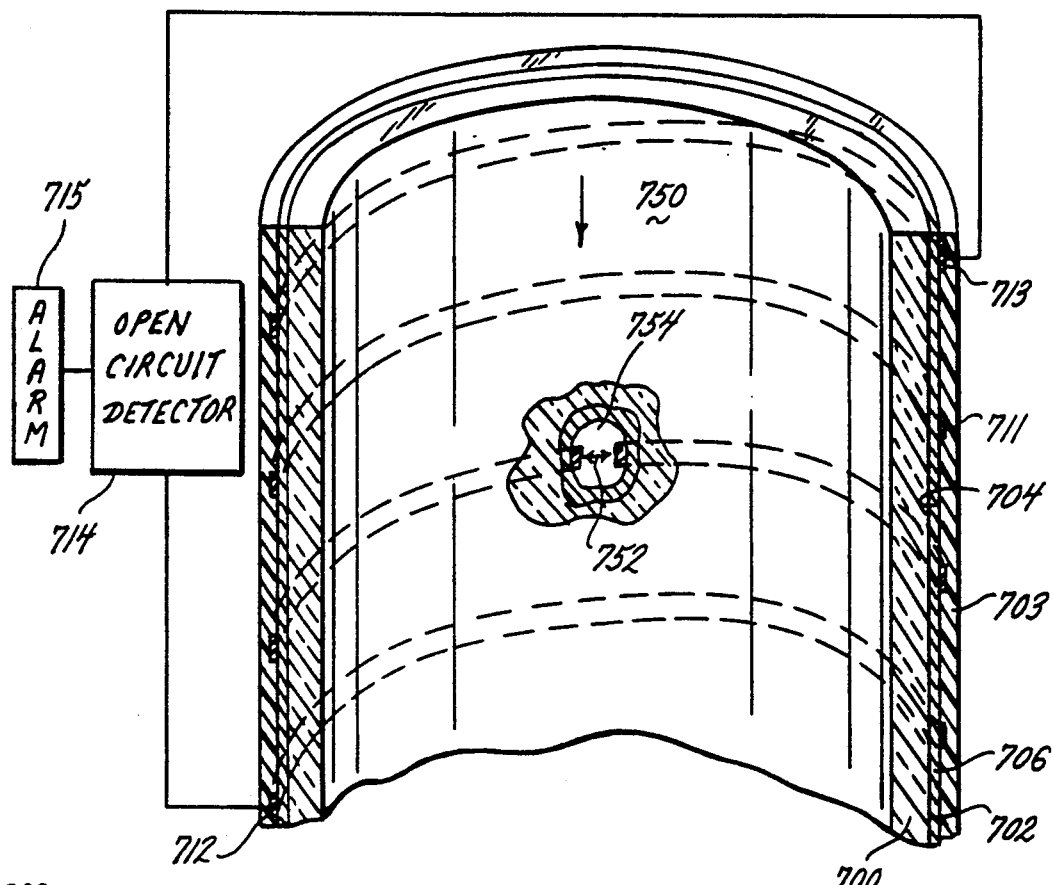
FIG. 7 is a longitudinal, cross-sectional view of a length of transfer conduit having a combined visual and electronic conductor embodying the invention and showing a wear-through area.

FIG. 7 illustrates another embodiment of the invention which combines many of the features illustrated in FIGS. 2-6. In particular, outer surface 702 of the conduit wall 700 is covered by a wear indicating layer 706 which, in turn, is covered by an armored layer or casing 703. The inner surface 704 of outer conduit 703 is in intimate contact with the colored indicating layer 706. In addition, an electrical conductor 711 is wound around color indicating layer 706 and is located between the inner surface 704 of outer casing 703 and the colored indicating layer 706. Alternatively, conductor 711 may be located between the outer surface 702 of wall 700 and indicating layer 706 (not shown). As in the FIG. 6 embodiment, the ends 712 and 713 of conductor 711 are connected to an open circuit detector 714. In operation, when a portion of the conduit wall 700 is worn away, as referred to by reference character 750, a discontinuity (shown by arrows 752) is created within conductor 711 and the corresponding portion of the colored indicating layer 706 is worn away creating an eroded area 754 which can be viewed through transparent outer conduit 703. In this case, open circuit detector 714 would indicate to the operator that a discontinuity is present through the alarm 715 and the operator would locate the discontinuity by visual inspection.

Figure 8:
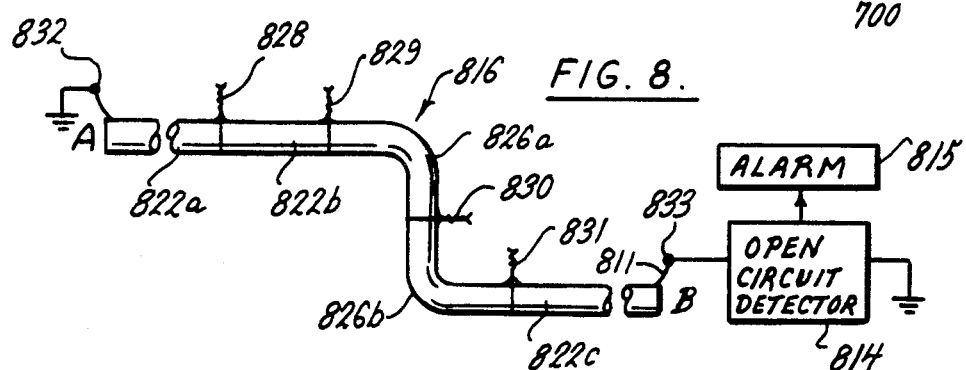
FIG. 8 is a diagram of a material transfer path formed of several sections of transfer conduit and having an electronic conductor connected to an open circuit detector.

FIG. 8 is similar to FIG. 1 in showing a material transfer piping system 816 in which conduit sections 822a, 822b and 822c and elbows 826a and 826b are assembled in a line to create a material flow path from point A to point B. The ends 812 of the electrical conductor 811 of adjacent conduit sections 822a and 822b are joined at point 828. Similarly, the connectors of 822b and 826a, etc. are sequentially connected in series at points 829, 830, 831, etc.. The other end 832 of the section 822a connector is grounded, and the other end 833 of section 822c connector is connected to an open circuit detector 814 including an alarm 815. In operation, open circuit detector 814 monitors the electrical continuity of the conductors 811 between points 832 and 833. Eventually, wear-through at any point within one or more of the piping sections will cause a discontinuity in the conductor line 811 which will result in an open circuit detected by open circuit detector 814 which, in turn, indicates an alarm via alarm 815. The operator is then advised to visually inspect the entire piping system 816 between points A and B to determine where the wear point is located. Alternatively, the operator could check the conductivity of each piping section 822-826 to determine the point of the discontinuity. Visual identification of any area of wear-through and/or electronic signalling will indicate that inspection of the entire system for replacement is in order since internal wear has taken place throughout the piping system 16 and massive failure may be imminent.

Figure 9A:
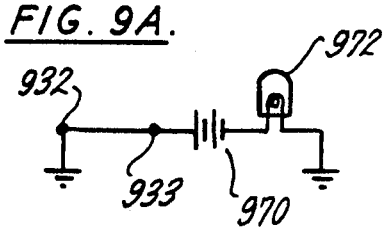
FIGS. 9A and 9B illustrate two embodiments of an open circuit detector and alarm for use with the electronic embodiment of the invention.
Figure 9B:
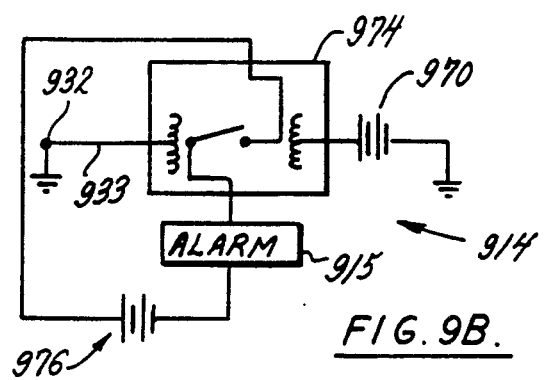

FIGS. 9A and 9B illustrate various embodiments of an open circuit detector 914 including an alarm 915. In its simplest form, the open circuit detector may be a power source such as batteries 970 located in series from points 932 and 933 and maintaining a light 972 or other visual indicator. When a discontinuity exists between points 932 and 933, the circuit is opened so that light 972 goes off and provides an indication that an open circuit condition exists. Alternatively, normally closed relay 974 may be located in series with battery 970 as illustrated in FIG. 9B. Battery 970 maintains normally closed relay 974 in an open condition (as illustrated) so that no power is supplied to alarm 915 from battery 976. When a discontinuity exists between points 932 and 933, power to normally closed relay 974 is interrupted causing the relay to close and complete the power circuit to alarm 915. The activation of alarm 915 (such as a bell or light) provides an indication to the operator that an open circuit condition exists and wear-through has occurred in the piping system.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An early warning system in combination with a material transfer system having an elongated area to be monitored for internal wear caused by the erosive action of an abrasive transfer material as it flows past such monitored area, said material transfer system including a material transfer conduit of substantial length defining said elongated monitored area and having a tubular wall with an inner wall surface forming the material flow passageway and with an outer wall surface;

said early warning system comprising wear detection means intimately applied on an elongate section of said outer wall surface and defining therewith at least a part of said elongated monitored area, said wear detection means comprising a visible indicator having a distinguishable characteristic normally visually discernible in situ at said elongate section of said outer wall surface and being subject to obliteration upon erosive wear of the underlying portion of the tubular wall through the wall surface and through the wear detection means, said distinguishable characteristic of said visible indicator providing for visual inspection along the length of said material transfer system and the elongated monitored area thereof to determine the point of any obliterating wear-through and thus indicate the relative integrity or impending failure of the material transfer conduit and the location point of such obliterating wear-through thereof as it occurs.

2. The early warning system of claim 1 and further comprising a translucent or transparent outer containment layer encasing the outer wall surface of said tubular wall and through which the distinguishable characteristic of said visible indicator is visibly discernible, said containment layer being constructed and arranged for confining the transfer material within the flow passageway at the time of wear-through of said transfer conduit and said wear detection means.

3. The early warning system of claims 1 or 2, in which said visible indicator comprises a colored layer applied in intimate surface contact with said elongate section of outer wall surface whereby visual inspection will signal relative wear-through indicative of the integrity of the material transfer conduit.

4. The early warning system of claim 3, wherein said colored layer comprises tape affixed to said outer wall surface, said tape being selected from a class of vinyl, paper and masking tape.

5. The early warning system of claim 4, wherein said tape is a fluorescent tape coated with an ultraviolet screen.

6. The early warning system of claim 4, wherein said tape is a pressure sensitive tape of predetermined color.

7. The early warning system of claim 4, in which said tape is spirally wound around said outer wall surface of said tubular wall.

8. The early warning system of claim 4, in which said tape is axially oriented on said outer wall surface of said tubular wall.

9. The early warning system of claim 3, wherein said colored layer comprises a layer of paint on the outer wall surface of said transfer conduit.

10. The early warning system of claim 9, in which a white substrate is applied to the outer wall surface, and said layer of paint is applied over said substrate.

11. The early warning system of claim 3, in which said colored layer is comprised of two different and contrasting colors, at least one of which is visually distinguishable from the color of the transfer material.

12. The early warning system of claim 11, in which said two contrasting colors are applied as dual bands to said outer wall surface.

13. The early warning system of claim 3 in which said tubular wall is formed of glass, and said color layer is comprised of non-glass material and constructed and arranged on the outer wall surface to provide an uncovered area of said outer wall surface through which the color of the transfer material is visible.

14. The early warning system according to claim 1, in which said tubular wall is formed of glass, and said visible indicator comprises particles of predetermined color impregnated within said tubular wall and being in contrast to the color of said transfer material, whereby the color of the transfer material will provide visual signalling absent the colored particles of said tubular wall at the point of such wear-through thereof.

15. The early warning system of claim 2, in which said tubular wall is formed of glass, and said containment layer comprises a translucent or transparent outer casing formed of fiberglass.

16. The early warning system of claims 1 or 2 wherein said visible indicator comprises a relatively thin colored layer externally applied on the wall surface of the transfer conduit, said colored layer having a color which is different from the color of the transfer material, whereby when the distinguishable characteristic of the colored layer is worn away, the color of the transfer material is visually noticeable at the worn-away location of the transfer conduit.

17. The early warning system of claim 1, and further comprising electrical signalling means constructed and arranged on said material transfer conduit in association with said visible indicator, said electrical signalling means including an electrical conductor member in intimate contact with the outer wall surface of said tubular wall, an open circuit detector connected in a closed circuit with said electrical conductor member, and an alarm responsive to the open circuit detector for signalling any discontinuity in said conductor member.

18. In combination with a material conveying system for transferring abrasive materials including a substantial length of transfer conduit having a tubular wall of substantial thickness with an exposed external wall surface and an interior material flow surface subjected to abrading wear by the flow of such transfer material thereagainst, the improvement comprising an early warning system for detecting wear-through of said tubular wall resulting from such abrasive wear, said early warning system comprising a visible indicator applied in intimate contact with an elongate section of said external wall surface, said visible indicator having means forming a distinguishable characteristic normally visibly discernible in situ along said elongate section of external wall surface and being subject to abrasive wear and obliteration substantially at the point of wear-through of an underlying portion of the tubular wall, said distinguishable characteristic of said visible indicator providing for visual inspection along the length of said transfer conduit to determine any obliterating wear-through and thus indicate the relative integrity or impending failure of the tubular wall and the location point of such obliterating wear-through thereof as it occurs, and a translucent or transparent outer containment layer encasing the external wall surface throughout its length and through which the condition of the visible indicator is discernible, said containment layer being constructed and arranged for confining the transfer material within the transfer conduit at the time of wear-through of said tubular wall and said visible indicator.

19. An early warning system in combination with a material transfer system having an elongated area to be monitored for internal wear caused by the erosive action of an abrasive transfer material as it flows past such monitored area, said material transfer system including a material transfer conduit of substantial length defining said elongated monitored area and having a glass tubular wall of substantial thickness with an inner wall surface forming the material flow passageway and with an outer wall surface;

said early warning system comprising wear detection means intimately applied on an elongate section of said outer wall surface and defining therewith at least a part of said elongated monitored area, said wear detection means comprising a visible indicator having a distinguishable characteristic normally visually discernible in situ at said elongate section of said outer wall surface and being subject to obliteration upon erosive wear of the underlying portion of the tubular wall through the outer wall surface and through the wear detection means;

a translucent or transparent outer containment layer of fiberglass encasing the outer wall surface of said tubular wall throughout its length and through which the condition of the distinguishable characteristic of said visible indicator is visibly discernible, said distinguishable characteristic of said visible indicator providing for visual inspection along the length of said material transfer system and the elongated monitored area thereof to determine the point of any obliterating wear-through and thus indicate the relative integrity or impending failure of the material transfer conduit and the location point of such obliterating wear-through thereof as it occurs, and said containment layer being constructed and arranged for confining the transfer material within the transfer conduit at the time of wear-through of said tubular wall and said wear detection means.

* * * * *